United States Patent [19]

Suzuki

[11] Patent Number: 5,737,534
[45] Date of Patent: Apr. 7, 1998

[54] TASK ALLOCATION IN A SYSTEM OF NETWORKED PROCESSORS

[75] Inventor: Shigeo Suzuki, Kawasaki, Japan

[73] Assignee: Canon Kabushiki Kaisha, Tokyo, Japan

[21] Appl. No.: 334,373

[22] Filed: Nov. 3, 1994

[30] Foreign Application Priority Data

Nov. 5, 1993 [JP] Japan .................. 5-276370

[51] Int. Cl.$^6$ ................................................ G06F 9/00
[52] U.S. Cl. ........................ 395/200.53; 395/561
[58] Field of Search .................. 395/200.08, 200.15, 395/475, 650, 700, 561, 569, 570, 200.53, 200.56

[56] References Cited

U.S. PATENT DOCUMENTS

| | | | |
|---|---|---|---|
| 5,237,673 | 8/1993 | Orbits et al. | 395/497.01 |
| 5,239,643 | 8/1993 | Blount et al. | 395/600 |
| 5,269,013 | 12/1993 | Abramson et al. | 395/650 |
| 5,506,987 | 4/1996 | Abramson et al. | 395/673 |

Primary Examiner—Glenn A. Auve
Attorney, Agent, or Firm—Fitzpatrick, Cella, Harper & Scinto

[57] ABSTRACT

One process which is executed by each information processing apparatus can be efficiently continued by another information processing apparatus in accordance with use states of memory resources of a plurality of information processing apparatuses. When the process continuously operates while reserving a remote page, the processor judges whether a higher efficiency is obtained by using which one of the method whereby the process is continuously executed as it is in the information processing apparatus in the present state and the method whereby the process is moved to the information processing apparatus in which a remote page exists and is continued. If it is judged that the latter method is better, context information necessary to execute the process at that time point is moved from the inherent information processing apparatus, thereby continuing the process by an OS on either one of the information processing apparatuses decided.

12 Claims, 2 Drawing Sheets

TASK ALLOCATION IN A SYSTEM OF NETWORKED PROCESSORS

BACKGROUND OF THE INVENTION

1. Field of the Invention

The invention relates to an information processing system and its method of use, in which memories that are arranged in a plurality of information processing apparatuses which are connected through a communication network construct a single memory space as a whole.

2. Related Background Art

Hitherto, in the case of an information processing system coupled by a low-speed communication network such as an LAN or the like, when a user program is produced and activated as a process, if a physical memory on an information processing apparatus which is intended to perform the process is insufficient, the OS having a virtual memory mechanism pages out the contents of a physical page memory whose use efficiency is low to an accompanying secondary memory apparatus or to another information processing apparatus, thereby reserving the physical page to itself. That is, even if a physical memory on another information processing apparatus with which communication is possible via communication network, is vacant, although such a vacant physical memory can be used indirectly, it cannot be used directly. This is because, since the speed of the communication network is slow, a hardware construction such that the physical memory of another information processing apparatus is directly seen cannot be obtained.

In recent years, however, a construction in which the physical memory is directly seen by another information processing apparatus can be realized because a communication medium such as an optical cable or the like having a reliability and a performance close to those of an internal processing apparatus to a certain extent has been put into practical use. A system such that a memory (or a part thereof) arranged with or a part of each information processing apparatus can be directly accessed from any information processing apparatus as a single memory space as a whole, has also been proposed. In the case of such a system, even if such a page-out is not executed, so long as a memory of another information processing apparatus is vacant, it is reserved and can be directly used.

However, when the physical memory on the information processing apparatus which is intended to perform the process is insufficient, in the case of reserving a page of another information processing apparatus as mentioned above, if physical pages are reserved at random from a plurality of information processing apparatuses without any regularity, there is the following problem: memory pages which are necessary to execute the process are distributed among a plurality of information processing apparatuses and, if the process is continuously executed in such a state, a processing efficiency of the system deteriorates.

This is because in the case where the processor which operates the process and the physical memory to be used exist on the same information processing apparatus, since the memory access is executed at a high speed, the processing speed is also high; however, in the case where they exist on separate information processing apparatuses coupled by a communication network, since the memory accessing speed is slow, the processing speed of the process is also slow.

SUMMARY OF THE INVENTION

The present invention is made to solve the above problems and it is an object of the invention to provide an information processing system and its method of use, in which, while context information necessary to execute a process is moved to the OS on either one of the information processing apparatuses which was judged to be efficient from the OS of an inherent information processing apparatus, by continuously executing the process on such an information processing apparatus, a processing efficiency of the process can be improved.

In the invention, when a process is produced and activated and physical pages are reserved in an on-demand manner, if the page cannot be reserved on the particular information processing apparatus which is operating the process, an assigning page deciding section decides from which information processing apparatus the physical pages are reserved, on the basis of information obtained by a memory scheduling information getting section. After that, when the process is continuously operating while reserving a remote page, a process movement judging section judges whether a higher efficiency is obtained by using (1) of a method wherein the process is continuously executed as it is on the information processing apparatus in the present state and (2) a method wherein the process is moved to the information processing apparatus on which the remote page exists and is continued. If it is judged that the latter method is better, a context moving section moves the context information necessary to execute the process at that time point to the OS of whichever one of the information processing apparatuses which was judged to be efficient from the OS on the inherent information processing apparatus. By continuing the process on the information processing apparatus selected in this manner, a processing efficiency of the process can be raised.

DETAILED DESCRIPTION OF THE PREFERRED EMBODIMENTS

Figure 1:
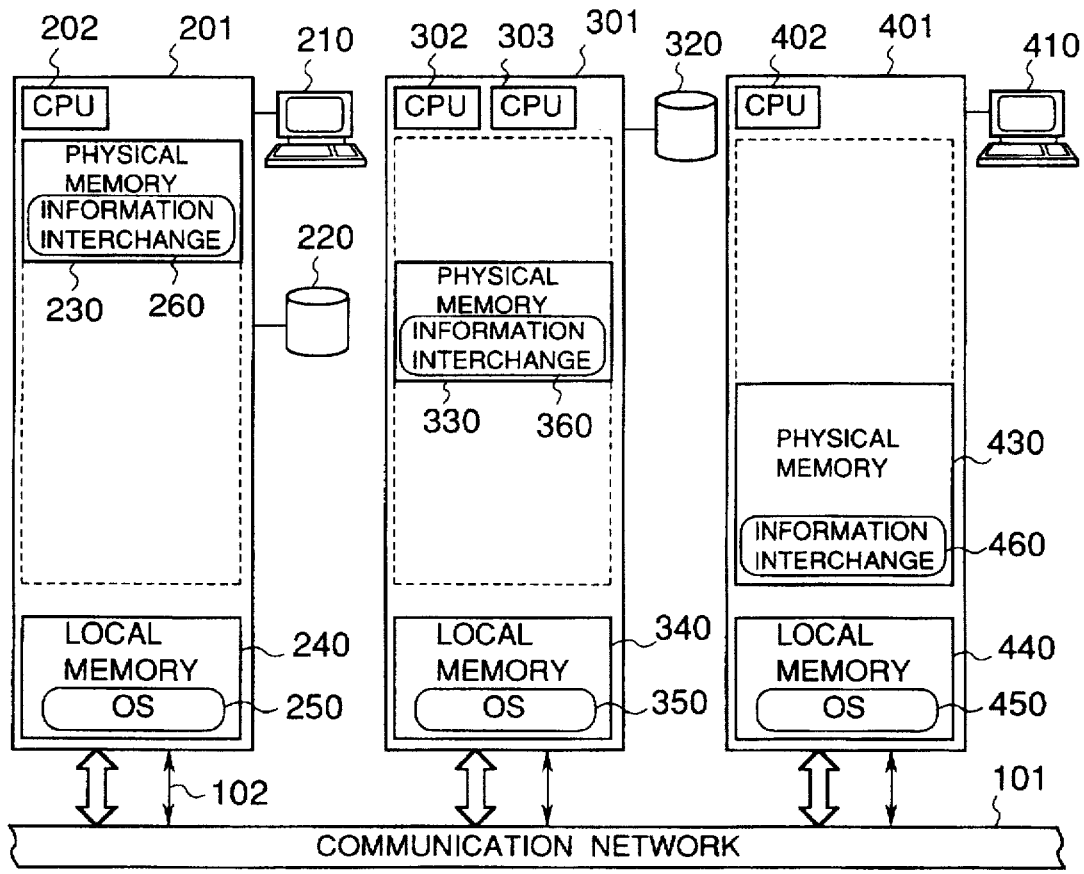
FIG. 1 is a block diagram for explaining a construction of an information processing system showing an embodiment of the invention.

FIG. 1 is a block diagram for explaining a construction of an information processing system showing an embodiment of the invention.

In the diagram, reference numeral 101 denotes a communication network of a high speed such as an optical network or like. The communication networks 101 is not limited to the optical network for transmitting information in the form of a photosignal, but can also comprise a high speed communication network which directly transmits information in the form of digital data as it is. For example, an ATM (asynchronous transfer mode) network or the like can be also used.

Reference numerals 201, 301, and 401 denote a plurality of information processing apparatuses coupled by the communication network 101. Reference numerals 202, 302, 303, and 402 DENOTE processors of the MMU built-in type (CPUs). One or more CPUs are provided for each of the information processing apparatuses 201, 301, and 401. Reference numerals 210 and 410 denote displays and keyboards as user interfaces provided for the information processing apparatuses 201 and 401; and 220 and 320 secondary memory apparatuses such as hard disc (HD) apparatuses or the like provided for the apparatuses 201 and 301.

It is not always necessary to provide the displays and keyboards 210 and 410. For example, the information processing apparatus 301, which doesn't have a display or keyboard, used as a server machine or a processor pool.

Reference numeral 102 denotes an inter-CPU interrupting mechanism for performing an asynchronous communication between the OSs which operate on each information processing apparatus.

Reference numerals 230, 330, and 430 denote physical memories which form a single memory space as a whole; and 240, 340, and 440 indicate local memories for the information processing apparatuses. Although the local memories are mainly necessary for the OS or the like, since the physical memories can be substituted in a part of the physical memories 230, 330, and 430, the presence or absence of the physical memories does not prevent application of the invention. Each processor is constructed so that the physical memories 230, 330, and 430 can be accessed. However, the accessing speed that can be attained when one of the processors accesses the physical memory which belongs to another information processing apparatus, is lower than the accessing speed attainable in accessing the physical memory in the same information processing apparatus, as the processor which accesses the memory because the communication network 101.

In the illustrated embodiment, it is assumed that OSs 250, 350, and 450 execute the scheduling, virtual memory management, and the like of a plurality of processors and obviously grasp system information regarding the physical memory on which information processing apparatus is set to which physical address. Such OSs have a construction such that the OSs having almost a similar function respectively operate on each information processing apparatus and function so as to cooperate with each other. The independence of each information processing apparatus, therefore, is improved, and the flexibility of the whole system is also improved.

Each OS can either operate on the local memories 240, 340, and 440 on each information processing apparatus or operate on the physical memories 230, 330, and 430.

However, parts of data areas of the OSs are arranged in information interchange regions 260, 360, and 460 on the physical memories 230, 330, and 430 in order to interchange the information of the memory management which is managed by each OS or scheduling information of a process.

Each OS is constructed so that a user program can be loaded through the communication network 101 not only from the secondary memory apparatus accompaying each information processing apparatus but also from the secondary memory apparatus accompanying another information processing apparatus in a similar manner.

In the system as shown in FIG. 1, when the user program is activated as a process and, for example, the process starts the operation by the processor 202 on the information processing apparatus 201, the physical memory is assigned as a page by the virtual memory managing mechanism of the OS 250 in an on-demand manner. The necessary contents (data or text) are loaded from the secondary memory apparatus or the like.

In this instance, although the OS 250 tries to assign the pages from the physical memory 230 (for which the accessing speed is high for the processor 202), when free pages are insufficient in the physical memory 230, then pages are assigned from the physical memories 330 and 430 (such a page is called a remote page for the process). In this instance, each OS 250 can know the number of free pages of each information processing apparatus, how busy the processor is, or the like for the information processing apparatuses other than the information processing apparatus 201 by using a memory scheduling information getting section.

On the basis of those pieces of information, an assigning page deciding section decides from which physical memory the page is reserved. Ideally, the physical page on the information processing apparatus in which the number of free pages is large and the processor is not busy, is chosen.

However, for example, in the case where the information processing apparatus 301 is in a state in which the processor is busy although the number of free pages is large, such a decision is experimentally made on the basis of the evaluation function in accordance with a degree of such a situation. Since the physical page is necessary at the first stage, a control to preferentially use the number of free pages is executed in accordance with how busy the processor is (its "busy state").

On the other hand, the memory scheduling information getting section can be realized by reflecting at any time the information possessed by each OS to the predetermined locations in the information interchange regions 260, 360, and 460 and by reading out the information from such locations when each OS is necessary.

When the assigning page deciding section decides that, for example, the pages are reserved from the physical memory 430, the remote page is reserved and assigned from the physical memory 430 by a remote page reserving section. The necessary contents (data and text) are loaded from the secondary memory apparatus or the like and the process is continued in a manner similar to the ordinary page.

In this embodiment, the remote page reserving section can be realized by the cooperative operation of the OS 250 and OS 450.

In this case, in order to report information indicative of the necessity of the physical page from the physical memory 430 to the OS 450, the OS 250 first writes the information by using the information interchange region 260 or 460 and asynchronously calls the OS 450 by using the inter-CPU interrupting mechanism 102 and waits until the result is obtained.

The processor can be also assigned to another processor during the waiting process.

On the other hand, the called OS 450 reserves the physical page from the physical memory 430 in accordance with the information from the OS 250 and sets the internal state so that the physical page is under the management of the OS 250. The information (physical address or the like) regarding the reserved physical page is written into the information interchange region 260 or 460 and asynchronously calls the OS 250 by using the inter-CPU interrupting mechanism 102 and transfers the physical page.

The interrupted OS 250 is released from the waiting state and assigns the reserved remote page to the purpose of executing the process.

Figure 2A:
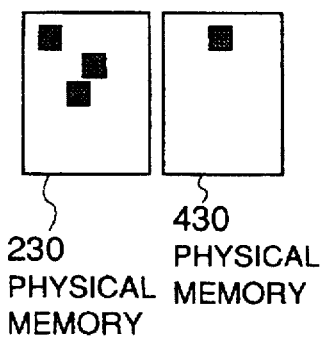
FIGS. 2A to 2C are diagrams for explaining physical page arranging states of physical memories in the information processing system according to the invention.
Figure 2B:
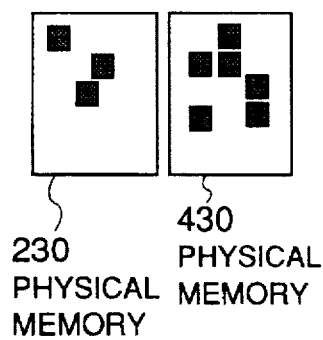
Figure 2C:
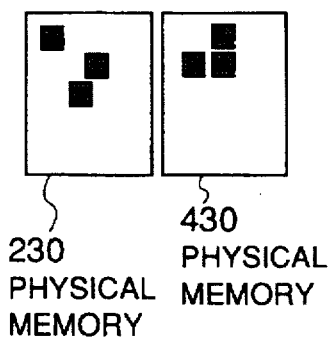

When the process continuously operates while reserving the page as mentioned above, the arranging state of the physical page of the physical memory changes as shown in FIGS. 2A to 2C.

The physical page arranging state of the physical memory in the information processing system according to the invention will now be described hereinbelow with reference to FIGS. 2A to 2C.

FIGS. 2A to 2C are diagrams for explaining the physical page arranging state of the physical memory in the information processing system according to the invention. The same portions as those in FIG. 1 are designated by the same reference numerals.

When the process continuously operates while reserving the page as mentioned above, the physical page arrangement between the physical memories 230 and 430 is in a state as shown in FIG. 2A. Therefore, there is a case where the physical page arranging state changes to a state as shown in FIG. 2B or 2C.

Particularly, as shown in FIG. 2B, the rate of the reserved physical pages of the physical memory 230 is larger than that of the physical memory 430. When the processor 402 of the information processing apparatus 401 is vacant, efficiency is better with execution of the process in the information processing apparatus 401, than in the case of continuously executing the process on the information processing apparatus 201.

The same shall also similarly apply to the case where the processor 202 is in a fairly busy state as compared with the processor 402 although the ratios of the physical pages are almost equal as shown in FIG. 2C.

Such a situation judgment as mentioned above is made by a process movement judging section. The process movement judging section judges whether a situation as shown in FIG. 2B or 2C, namely, a situation in which the process should be moved has occurred or not by the memory scheduling information getting Section on the basis of the arrangement information of the pages of the process as a target and the information indicative of a busy state degree of the processor. The process movement judging section is activated at the timing to reserve the pages in an on-demand manner, the timing for scheduling of the process or for the production/deletion or the like of the process, and the timing at which a load of the processor changes (the number of processes to be executed changes) at the time of the scheduling of the process or the production/deletion of the process or the like.

When a move of the process and the information processing apparatus on the movement destination side are decided by the process movement judging section, the process is temporarily interrupted by the context moving section, the context information (register value of the processor, page arrangement information of the page which is in use, and the like) necessary to execute the process is moved, and the process is continuously executed in the information processing apparatus on the movement-destination side.

For example, when a move from the information processing apparatus 201 to the information processing apparatus 401 is decided on, the OS 250 temporarily stops the target process and deletes it from the run queue for management of the scheduling of the process. In a manner similar to the case of the remote page reserving section, the context information is sent to the OS 450 using the information interchange region 260 or 460 and the inter-CPU interrupting mechanism 102. The OS 450, once it has received the context information, produces a management structure of the process on the basis of the context information, connects it with the run queue and continues the process on the information processing apparatus 401. After that, the moved process continuously operates under the management of the OS 450.

Thus, a plurality of information processing apparatuses 201, 301, and 401 are coupled by the high speed communication network 101. The physical memories (or parts thereof) 230, 330, and 430 arranged to the information processing apparatuses constitute memory space as a whole. As a whole system, it is possible to construct an information processing apparatus which can operate in form like a multiprocessor system of the NUMA type (i.e., a form such that although the accessing speed for access to the memory in a processor's own apparatus is high when it is seen from a certain information processing apparatus and the accessing speed to a memory in another information processing apparatus is not so high, since a single memory space is constructed as a whole, the system can be regarded as a multiprocessor system). Therefore, when the process is produced and activated and the physical pages are reserved in an on-demand manner, if no page can be reserved in the information processing apparatus in which the process is operating, which information processing apparatus the physical pages are reserved from is determined by the assigning page deciding section on the basis of the information obtained by the memory scheduling information getting section. After that, when the process continuously operates while reserving the remote page, the process movement judging section judges whether a higher efficiency will be obtained by using (1) a method wherein the process is continuously executed as it is in the information processing apparatus in the present state, and (2) method wherein the process is moved to the information processing apparatus in which the remote page exists and is continued there. When it is judged that the latter method is better, the context moving section moves the context information necessary to execute the process at that time point to the OS on whichever one of the information processing apparatuses which was judged to be efficient from the OS on the inherent information processing apparatus. By continuing the process on the information processing apparatus selected in this manner, the processing efficiency of the process can be raised.

The memory resource management processing operation in the information processing system according to the invention will now be described with reference to the flowchart shown in FIG. 3.

Figure 3:
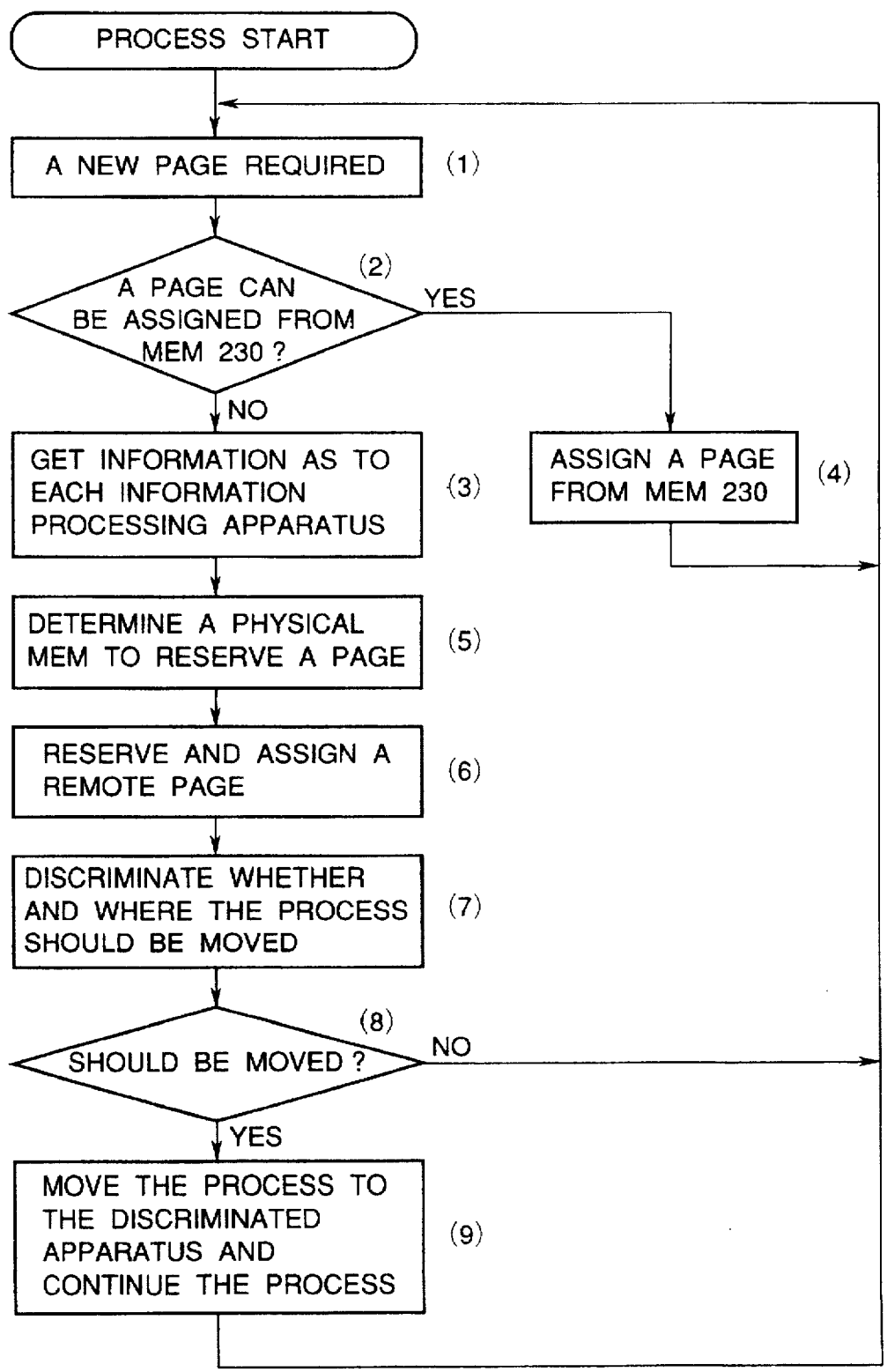
FIG. 3 is a flowchart showing an example of a memory resource management processing procedure in the information processing system according to the invention.

FIG. 3 is a flowchart showing an example of a memory resource management processing procedure in the information processing system according to the invention. Reference numerals (1) to (9) show processing steps, and the case where the program is activated on the information processing apparatus 201 will now be described as an example.

When the process is activated on the information processing apparatus 201, a new page is required (step 1). A check is made to see if a page can be assigned from the physical memory 230 or not (2). When it can be assigned, the page is assigned from the physical memory 230 (4). The processing routine is returned to step (1).

When it is judged in step (2) that the page cannot be assigned, the information of each information processing apparatus is obtained by the memory scheduling information getting section (3). A physical memory to reserve the page is subsequently decided by the assigning page deciding section (5). The remote page is reserved and assigned by the remote page reserving section (6). Whether the process should be moved or not is judged by the process movement judging section and the movement destination is decided (7). A check is now made to see if the process should be moved or not (8). If NO, the processing routine is returned to step (1). If YES, the process is moved to the decided information processing apparatus by the context moving section and the process is continued (9). The processing routine is returned to step (1).

The above embodiment has been described with respect to the case where the apparatus has the inter-CPU interrupting mechanism 102 and the remote reserving section and context moving section are realized by using the inter-CPU interrupting mechanism 102. However, a similar effect can be expected by using a construction such that the above process is executed by a polling mechanism of a flag sense even if the inter-CPU interrupting mechanism 102 is not used.

For example, in the case of a situation as mentioned in the above embodiment, the remote page reserving section can be realized by the cooperative operation of the OS 250 and OS 450. The inter-CPU interrupting mechanism 102 is used for asynchronous communication at that time.

Alternatively, the above process is substituted by the following system. That is, the OS in a position which causes an interruption turns on a flag in a flag area provided in the information interchange region 260 or 460, in place of causing an inter-CPU interruption.

On the other hand, the OS corresponding to the position side which accepts the inter-CPU interruption makes operative a control such as a demon process for sensing whether the flag has been turned on or not. When it is confirmed that the flag has been turned on, the OS executes the same process as the process when the inter-CPU interruption was accepted.

However, since it is not always possible for the OS 250 or 450 to perform the flag sense, a routine (demon process) to execute the flag sense is constructed so as periodically to sense the flag at a certain interval (for example, about 10 msec).

The above embodiment has been described with respect to the case where the process movement judging section is activated at the timing to reserve the page in an on-demand manner and at the timing when the load of the processor changes. The invention can be also realized by the following construction.

That is, the process movement judging section and the context moving section are realized by a form such as a demon process in the OS and the judgment and movement are asynchronously executed. However, to avoid the demon process obstructing execution of another process, it is desirable to set its priority to a somewhat low priority.

The demon process operates in the OS on each information processing apparatus and all of the processes which are managed by each OS are judged as targets. It is also possible to construct such as to judge with respect to the processes which are managed by the OSs other than the self OS. Such a construction is effective in the following case.

For instance, it is also possible to construct the process in a manner such that in the case where since one information processing apparatus is busy, a demon processing section (process movement judging section) of a low priority cannot be smoothly operated, a demon process which operates on another information processing apparatus substitutionally performs the judgment.

According to the invention as described above, when the process is produced and activated and the physical pages are reserved in an on-demand manner, if the page cannot be reserved on the information processing apparatus in which the process is operating, from which information processing apparatus the physical page is reserved is decided by the assigning page deciding section on the basis of the information obtained by the memory scheduling information getting section. After that, when the process continuously operates while reserving the remote page, the process movement judging section judges whether a higher efficiency is obtained by using (1) the method wherein the process is continuously executed as it is on the information processing apparatus in the present state and the method whereby the process is moved to the information processing apparatus in which the remote page exists and the process is continued thereon. If it is judged that the latter method is better, the context moving section moves the context information necessary to execute the process at that time point to the OS whichever one of the information processing apparatuses was judged to be efficient from the OS on the inherent information processing apparatus and the process is continued on such an information processing apparatus, so that the processing efficiency of the process can be raised.

Therefore, while the processing is being executed in either one of the information processing apparatuses, the processing of the process can be executed in parallel while entrusting to another information processing apparatus. There is an effect such that the process executing efficiency of the whole system can be remarkably improved.

What is claimed is:

1. An information processing system comprising a plurality of information processing apparatuses connected through a communication network, each said information processing apparatus having a processor and a memory, and the memories of the plurality of information processing apparatuses together forming one single memory space, said system comprising:

getting means for getting information relating to each of said information processing apparatuses;

judging means for judging whether a certain process can be executed more efficiently by the processor in one of said information processing apparatuses than by the processor in another one of said information processing apparatuses which is currently executing the certain process, based on the information gotten by said getting means; and executing means for executing the certain process using the processor in said one information processing apparatus, in response to an affirmative judgment provided by said judging means, wherein said executing means executes the process in a case where the memory of the information processing apparatus which is executing the certain process is insufficient.

2. A system according to claim 1, wherein the information obtained by said getting means includes at least information regarding the memory.

3. A system according to claim 1, wherein the information obtained by said getting means includes at least information regarding the memory and an operating state of the processor.

4. A system according to claim 1, wherein each said memory is a physical memory.

5. An information processing system comprising a plurality of information processing apparatuses connected through a communication network, each said information processing apparatus having a processor and a memory, and the memories of the plurality of information processing apparatuses together forming one single memory space, said system comprising:

getting means for getting information relating to the memory and to load on the processor of each of said information processing apparatuses;

judging means for judging whether a certain process can be executed more efficiently by the processor in one of said information processing apparatuses than by the processor in another one of said information processing apparatuses which is currently executing the certain process, based on the information gotten by said getting means;

control means for controlling the processor in said one information processing apparatus to execute the certain process, in response to an affirmative judgment provided by said judging means; and executing means which executes the process in a case where the memory of the information processing apparatus which is executing the process is insufficient.

6. A system according to claim 5, wherein each said memory is a physical memory.

7. A system according to claim 5, wherein the certain process is a user program.

8. An information processing system comprising a plurality of information processing apparatuses connected through a communication network, each information processing apparatus having a processor and a memory, and the memories of the plurality of information processing apparatuses together forming one single memory space, said system comprising:

getting means for getting information relating to one said information processing apparatus, if the memory becomes full in a second said information processing apparatus which is currently executing a certain process;

judging means for judging whether the certain process can be executed more efficiently by the processor in said one information processing apparatus than by the processor in said second information processing apparatus, based on the information gotten by said getting means; and control means for controlling the processor in said one information processing apparatus to execute the certain process in response to an affirmative judgment provided by said judging means.

9. A system according to claim 8, wherein the information obtained by said getting means includes at least information relating to the memory and an operating state of the processor.

10. A system according to claim 8, wherein the certain process is a user program.

11. A system according to claim 8, wherein each said memory is a physical memory.

12. An information processing method for use in an information processing system comprising a plurality of information processing apparatuses connected through a communication network, each information processing apparatus having a processor and a memory, and the memories of the plurality of information processing apparatuses together forming one single memory space, said method comprising:

a getting step of getting information relating to one information processing apparatus, if the memory becomes full in a second information processing apparatus which is currently executing a certain process;

a judging step of judging whether the certain process can be executed more efficiently by the processor in the one information processing apparatus than by the processor in the second information processing apparatus, based on the information gotten in said getting step; and a control step of controlling the processor in the one information processing apparatus to execute the certain process in response to an affirmative judgment provided in said judging step.

* * * * *

UNITED STATES PATENT AND TRADEMARK OFFICE
CERTIFICATE OF CORRECTION

PATENT NO. : 5,737,534

DATED : April 7, 1998

INVENTOR(S) : SHIGEO SUZUKI

Page 1 of 3

It is certified that error appears in the above-identified patent and that said Letters Patent is hereby corrected as shown below:

AT [57] ABSTRACT

Line 7, "which one" should read --either--;
    Line 8, "of" should be deleted; and
    Line 10, "and" should read --or--.

COLUMN 1

Line 24, "via" should read --via a--;
    Line 34, "internal" should read
        --internal bus of an information--; and
    Line 37, "or a" should read --or as--.

COLUMN 2

Line 19, "of" should be deleted;
    Line 21, "state" should read --state,--;
    Line 53, "networks" should read --network--;
    Line 54, "the optical network" should read
        --the optical networks--;
    Line 58, "be" should be deleted;
    Line 59, "also" should read --also be--; and
    Line 63, "DENOTE" should read --denote--.

COLUMN 3

Line 7, "used" should read --is used--;
    Line 27, "as the processor which accesses the memory"
        should be deleted; and
    Line 28, "the" should read --of the--.

UNITED STATES PATENT AND TRADEMARK OFFICE
CERTIFICATE OF CORRECTION

PATENT NO. : 5,737,534
DATED     : April 7, 1998
INVENTOR(S) : SHIGEO SUZUKI

Page 2 of 3

It is certified that error appears in the above-identified patent and that said Letters Patent is hereby corrected as shown below:

COLUMN 4

Line 65, "2C." should read --2C, and will now be described.--;
    Line 66, "The physical page arranging state of the physical memory" should be deleted; and
    Line 67, "in the information processing system according to the inven-" should be deleted.

COLUMN 5

Line 1, "tion will now be described hereinbelow with reference to" should be deleted;
    Line 2, "FIGS. 2A to 2C." should be deleted; and
    Line 31, "Section" should read --section--.

COLUMN 6

Line 2, "constitute" should read --constitute a single--; and
    Line 23, "method" should read --a method--.

COLUMN 7

Line 13, "by" should read --for--; and
    Line 41, "to a" should be deleted and "priority" should be deleted.

UNITED STATES PATENT AND TRADEMARK OFFICE
CERTIFICATE OF CORRECTION

PATENT NO. : 5,737,534

DATED : April 7, 1998

INVENTOR(S) : SHIGEO SUZUKI

It is certified that error appears in the above-identified patent and that said Letters Patent is hereby corrected as shown below:

<u>COLUMN 8</u>

Line 2, "state and" should read --state, or (2)-- and "whereby" should read --wherein--; and Line 7, "OS" should read --OS on--.

Signed and Sealed this

First Day of December, 1998

Attest:

BRUCE LEHMAN

*Attesting Officer*  *Commissioner of Patents and Trademarks*